Patented Aug. 1, 1950

2,517,418

UNITED STATES PATENT OFFICE 2,517,418

PRODUCTION OF ETHERS OF PHENYL METHYL CARBINOL AND ITS HOMOLOGUES

Donald Faulkner, Cambridge, and Francis Edward Salt, Banstead, England, assignors to The Distillers Company, Limited, Edinburgh, Scotland, a British company No Drawing. Application September 18, 1946, Serial No. 697,828. In Great Britain September 27, 1945

5 Claims. (Cl. 260—611)

1

This invention is for improvements in or relating to the production of ethers of phenyl methyl carbinol and its homologues. It is already known that styrene and its homologues can be heated with alcohols in the presence of an acidic catalyst to form the corresponding ethers of phenyl methyl carbinol, see, for example British Patent Specification No. 517,934. Examples of acidic catalysts which may be employed in the reaction include sulphuric acid, alkyl sulphuric acids, acidic salts and alkyl and aryl sulphonic acids. The reaction may be conducted under increased pressure or under atmospheric pressure with reflux.

It has already been suggested that the polymerisation of styrene which takes place during the reaction can be minimised by the use of pyrogallol as a polymerisation inhibitor and it is an object of the invention to provide a more efficient inhibition of the tendency polymerisation of the styrene or its homologues during the reaction.

According to the present invention there is provided a process for the production of ethers of phenyl methyl carbinol and their homologues which comprises heating styrene or a homologue thereof with an alcohol in the presence of an acidic catalyst and in the presence of phenylacetylene.

We have found that phenylacetylene is superior to pyrogallol as a polymerisation inhibitor for a number of reasons. In view of the fact that phenylacetylene has a boiling point not far from that of styrene, the phenyl acetylene serves to stabilise the styrene not only in the bulk liquid in the reactor but also in the reflux. The stabilising action of phenylacetylene is the more surprising in view of the fact that it contains a highly reactive triple bond and would be expected to react more readily than does styrene under the conditions of the reaction and therefore would disappear rapidly from the reaction mixture. It can be shown, however, that all the phenyl-acetylene is not destroyed during the reaction and consequently only very small quantities need be used. On account of the volatility of phenylacetylene, it may be desirable particularly when only small quantities of the phenylacetylene are used, to add an additional stabiliser compound, such as pyrogallol or hydroquinone, which is relatively non-volatile to ensure the presence of a sufficient quantity of stabiliser in the liquid contents of the reactor. We have also found, somewhat surprisingly, that the phenyl-

2 acetylene does not interfere with the etherification reaction.

The process of this invention is particularly valuable when styrene or a homologue thereof, such as para-methylstyrene and vinyl xylene is condensed with a higher monohydric alcohol having a boiling point higher than about 160° C., e. g. benzyl alcohol beta-phenylethanol n-hexyl alcohol and its homologues. The use of such alcohols means that high temperatures are attained in the liquid during the condensation, and the tendency for the styrene to polymerise is thereby increased.

The following examples illustrate the manner in which the invention may be carried into effect and afford a comparison of the use of pyrogallol and phenylacetylene as polymerisation inhibitors in the etherification reaction.

*Example 1.*—Two experiments were carried out in which styrene was reacted with benzyl alcohol. In each case, a mixture of 135 grams of benzyl alcohol, 135 grams of styrene and 2.5 grams of p-toluene sulphonic acid, together with inhibitor, was heated under reflux with stirring in an oil bath, the temperature of which was maintained at 155°–160° C. for a period of 7 hours. After cooling the reaction mixture was washed three times with a 5% by weight brine to remove the catalyst, the organic layer was dried over anhydrous sodium sulphate and distilled under vacuum. Unchanged styrene was first distilled off at 40°–45° C. at 15 mm. pressure, and unchanged benzyl alcohol was next collected at 38°–45° C. at 0.5–1 mm. pressure. The reaction product, consisting principally of benzyl alpha-methyl benzyl ether, was collected at 87°–94° C. at 0.5–1 mm. pressure; its refractive index was $n_D^{20}=1.5577$. In the first experiment, 2 grams of pyrogallol, and in the second experiment, 2 grams of phenylacetylene, was used as the polymerisation inhibitor. The products obtained are detailed in the table below:

|  | 1st Expt. (Pyrogallol) | 2nd Expt. (Phenylacetylene) |
|---|---|---|
|  | Grams | Grams |
| Styrene recovered | 36 | 42 |
| Benzyl alcohol recovered | 27 | 23 |
| Benzyl alpha-methylbenzyl ether | 135 | 148 |
| Residue (resinous) | 55 | 39 |

In the first experiment, deposition of polymer was evident in those ground glass joints of the apparatus which were in contact with the refluxing styrene. No such deposition of polymer occurred in the second experiment. A portion of the styrene recovered from the second experiment was added to an alcoholic solution of silver nitrate; a white precipitate formed, indicating the presence of phenylacetylene.

*Example 2.*—Styrene was reacted with beta-phenyl-ethyl alcohol in two experiments according to the method described in Example 1. In each case, the reaction mixture consisted of 153 grams of beta-phenyl-ethyl alcohol, 135 grams of styrene, 2.5 grams of p-toluene-sulphonic acid, and 2 grams of inhibitor; pyrogallol was used as inhibitor in the first experiment, and phenylacetylene in the second. The reaction product, beta-phenylethyl alpha-methylbenzyl ether, was isolated as a colourless liquid boiling at 86°–89° C. at 0.5 mm. pressure, and had a refractive index of $n_D^{20}=1.5891$. The products obtained in the two experiments are detailed in the table below:

|  | 1st Expt. (Pyrogallol) | 2nd Expt. (Phenylacetylene) |
| --- | --- | --- |
|  | Grams | Grams |
| Styrene recovered | 40 | 45 |
| Phenylethyl alcohol recovered | 36 | 20 |
| Phenyl ethyl methylbenzyl ether | 132 | 160 |
| Residue (resinous) | 60 | 41 |

*Example 3.*—Two experiments were carried out on the reaction between styrene and the monobutyl ether of ethylene glycol, using in each case a mixture of 100 grams of styrene, 120 grams of ethylene glycol monobutyl ether, 3 grams of p-toluenesulphonic acid, and 2 grams of inhibitor. Pyrogallol was used as inhibitor in the first experiment and phenylacetylene in the second. The reaction mixtures were heated under reflux with stirring in an oil bath maintained at 160°–170° C. for 14 hours. The products were worked up as described in Example 1, but the unreacted styrene and ethylene glycol butyl ether were not separated.

The reaction product, butoxyethyl alpha-methylbenzyl ether, was obtained as a colourless liquid, boiling at 81°–85° C. at 1 mm. pressure, and having a refractive index of $n_D^{20}=1.4802$. The yields of product and resinous residue obtained in the two experiments are given in the table below:

|  | 1st Expt. (Pyrogallol) | 2nd Expt. (Phenylacetylene) |
| --- | --- | --- |
|  | Grams | Grams |
| Butoxyethyl alpha-methylbenzyl ether | 40 | 46 |
| Resin | 36 | 20 |

The results quoted in the foregoing examples show that somewhat greater yields can be achieved by the use of phenylacetylene as polymerisation inhibitor than are obtained with pyrogallol.

What we claim is:

1. A process for the production of an ether of phenyl methyl carbinol which comprises, heating a mixture of styrene with an aralkyl alcohol having a saturated hydrocarbon group attached to the hydroxyl group, an acidic catalyst and phenyl acetylene.

2. A process for the production of an ether of phenylmethyl carbinol which comprises refluxing a mixture comprising styrene, benzyl alcohol, phenylacetylene and an acidic catalyst.

3. A process for the production of an ether of phenylmethyl carbinol which comprises refluxing a mixture comprising styrene, beta-phenyl ethyl alcohol, phenylacetylene and an acidic catalyst.

4. A process for the production of an ether of phenylmethyl carbinol which comprises heating a mixture of styrene, benzyl alcohol and toluene-sulphonic acid at refluxing temperatures in the presence of a small amount of phenylacetylene.

5. A process for the production of an ether of phenylmethyl carbinol which comprises heating a mixture of styrene, beta-phenyl ethyl alcohol and toluenesulphonic acid at refluxing temperatures in the presence of a small amount of phenylacetylene.

DONALD FAULKNER.
FRANCIS EDWARD SALT.

REFERENCES CITED

The following references are of record in the file of this patent:

UNITED STATES PATENTS

| Number | Name | Date |
| --- | --- | --- |
| 1,959,927 | Reppe | May 22, 1934 |
| 2,017,355 | Reppe | Oct. 15, 1935 |
| 2,021,869 | Reppe | Nov. 19, 1935 |
| 2,066,076 | Reppe | Dec. 29, 1936 |
| 2,136,217 | Mitchell | Nov. 8, 1938 |
| 2,241,770 | Dreisbach | May 13, 1941 |
| 2,248,518 | Stanley | July 8, 1941 |

FOREIGN PATENTS

| Number | Country | Date |
| --- | --- | --- |
| 517,934 | Great Britain | Feb. 13, 1940 |